United States Patent
Tsunoda et al.

[11] 3,897,996
[45] Aug. 5, 1975

[54] ELECTRO-OPTIC DISPLAY DEVICE

[75] Inventors: Ichiro Tsunoda; Satoshi Takeuchi, both of Kawasaki; Yoichiro Hirao, Tokyo; Takeo Suzuki, Tokyo; Yoshihiro Nishiue, Tokyo; Katsumasa Tadokoro, Tokyo; Toshimasa Fukagawa, Tokyo; Isamu Harada, Warabi; Akira Misawa, Tokyo; Kazuo Watanabe, Tokyo; Kazuo Saito, Tokyo, all of Japan

[73] Assignee: Dainippon Printing Co., Ltd., Tokyo, Japan

[22] Filed: Sept. 21, 1973

[21] Appl. No.: 399,484

[30] Foreign Application Priority Data
- Sept. 30, 1972 Japan.............................. 47-98288
- Sept. 30, 1972 Japan.............................. 47-98289
- Nov. 25, 1972 Japan.............................. 47-118267
- Jan. 22, 1973 Japan.............................. 48-009282
- Feb. 3, 1973 Japan.............................. 48-014103
- Feb. 10, 1973 Japan.............................. 48-16940
- June 11, 1973 Japan.............................. 48-065568

[52] U.S. Cl............................... 350/150; 350/160
[51] Int. Cl............................................. G02f 1/26
[58] Field of Search ........... 350/147, 150, 151, 160, 350/DIG. 2; 340/173 LT, 173 LS

[56] References Cited
UNITED STATES PATENTS

| | | | |
|---|---|---|---|
| 3,512,864 | 5/1970 | Heartling et al. | 350/150 |
| 3,592,527 | 7/1971 | Conners | 350/150 |
| 3,722,206 | 3/1973 | Bergey | 350/150 |
| 3,744,875 | 7/1973 | Haertling | 350/150 |
| 3,781,085 | 12/1973 | Leibowitz | 350/150 |

*Primary Examiner*—Alfred E. Smith
*Assistant Examiner*—Michael J. Tokar
*Attorney, Agent, or Firm*—Donald D. Mon; D. Gordon Angus

[57] ABSTRACT

In an electro-optic display device, a front substrate having film electrodes is confronted with a rear substrate having a film electrode through electro-optical matter which upon application of an electric field will produce an electro-optical phenomenon. The electro-optic display device has a part where no optical image is produced even if an electric field is applied thereto because of further provision of an insulating layer and a film electrode between the front and rear substrates. Due to this specific feature, the electro-optic display device can be applied to an electronic time piece and a transducer for temperature or so on.

13 Claims, 33 Drawing Figures

ELECTRO-OPTIC DISPLAY DEVICE

BACKGROUND OF THE INVENTION

This invention relates to an electro-optic device in which there are provided electro-optical matter whose electro-optical properties are changed by the presence of an electric field applied thereto, sandwiched between a pair of substrates provided with film electrodes for showing a desired optical image such as characters, numerical figures and pictures, and also film leads for connecting the film electrodes to an external voltage source. More particularly to an electro-optic display device in which an electric field is applied to the film electrodes through the film leads in a part of the device which is outside a region where the optical image is shown by the film so that no electro-optical phenomenon is presented by the electro-optical matter at this outside region.

Various electro-optical matters which show an electro-optical phenomenon in the presence of a relatively low electric field are well-known in the art. These electro-optical matters can be classified into two groups: that is, in one of the two groups there are some organic matters which show meso phase thereby indicating that they are a state of matter intermediate between the liquid and crystalline states, and mixtures of them in which a so-called crystalline liquid is essentially contained; while in the other group there are so-called "colloidal liquids" which are obtained by dispersing non-organic crystals such as tungsten oxides and vanadium oxides or anisotropic crystals such as herapathite into solvents, one typical example of the colloidal liquids being one available as a trade name VARAD (made by MARKS POLARIZED CO.) at the market.

Most of these electro-optical matters show Pockels effect and Kerr effect in a low electric field and some of them show light-scattering effects. For instance, upon application of an electric field some kinds of crystalline liquid matters change their states from a state of optical isotropy to a state of optical anisotropy, thereby showing Pockels effect. Upon application of an electric field, in some crystalline liquid matters a molecular turbulent flow occurs whereby incident light is scattered, this being the so-called "dynamic scattering effect," while in some other crystalline liquid matters only the light having a particular wave length is selectively reflected thereby showing a colored image.

If such an electro-optical matter is sandwiched by a pair of electrodes which forms optical images such as characters, numerical figures and patterns and is then subjected to an electric field, the electro-optical matter shows an electro-optical phenomenon at its part only where the electric field is applied, thereby showing an optical image corresponding to the figures of the electrodes. In order to utilize Pockels effect and Kerr effect of an electro-optical matter, obviously a pair of linear polarizing plates should be provided. The arrangement of crystalline liquid display devices well-known in the art is based on the above-described principle.

The arrangement or construction of the crystalline liquid display device without the linear polarizing plates will be described in more detail.

In this conventional crystalline liquid display device, a film of crystalline liquid matter is sandwiched between a front substrate and a rear substrate which are slightly spaced apart and on each of the inner surfaces of the front and rear substrates there are provided film electrodes in the form of characters, numerical figures or patterns and films leads for connecting the film electrodes to an external voltage source, the film electrodes and film leads being provided to apply an electric field to the crystalline liquid matter. If all of the parts of the crystalline liquid display device are optically transparent, this device is a transmission type device in which when light is emitted from the rear side of the device an optical image can be observed from the front side thereof. On the other hand, if film electrode on the rear substrate or one side of the rear substrate is optically reflective, we can obtain a display device in which we can observe an optical image on the front side thereof while radiating light to the front side.

Regardless of whether there is the reflection type or the transmission type, in the crystalline liquid display devices, the film electrodes shaped as characters or patterns should be provided in place on the inner opposed surfaces of the substrates, in such a manner that these film electrodes on the respective substrates are juxtaposed to each other. While the film leads for the film electrodes should be provided on the inner opposed surfaces of the substrates they should not be juxtaposed to each other. If even parts of the film leads are arranged to be stacked one on another, upon energization of the film electrodes through the film leads in a part of the device which is outside a region where an optical image is to be produced, a light scattering phenomenon occurs, as a result of which the quality of the image is lowered.

In the case where the pattern of the optical image is relatively simple, it is readily achieved to arrange the film leads on the respective substrates so that they are not confronted with each other. However, it is often difficult to do so in the case where the pattern of the optical image to be produced is intricate. In such a case, if the film leads are forcibly arranged so as not to confront each other, it is necessary to make the length of the film lead abnormally long, as a result of which a voltage drop due to resistance of the film lead becomes quite great. This voltage drop may cause trouble in the operation of the crystalline liquid display device.

Furthermore, if in each of the front and rear substrates, only the part corresponding to a character or a pattern is provided with the film electrode, the alignment of the film electrodes will be difficult in the process of assembling the display device. Accordingly, an optical image produced by such a display device is often unclear. Especially, if the crystalline liquid display device constituted by this method is of a reflection type, it will clearly show a latent image even when it is not operated. Accordingly, this method is undesirable from a practical point of view.

In order to overcome the above-described difficulties accompanying the crystalline liquid display device, an improved crystalline liquid display device has heretofor been proposed in which a film electrode is provided over the whole area of the confronting surface of one of two substrates, and in a part of the device where the film electrode provided on the rear substrate confronts an imageless portion of film electrode or film leads outside a region where an optical image appears an insulating layer is provided on the surface of the imageless portion of film electrode or film leads on the front substrate or rear substrate. Furthermore in the portion where the insulating layer is thus provided no electric current is applied.

However, specific resistivity of an insulating layer which can be readily manufactured is not very high when compared with that of a crystalline liquid matter, hence when a high voltage is applied thereto, the crystalline liquid matter produces the electrooptical phenomenon through the insulating layer. Accordingly it is impossible by this expedient to achieve the original object of the insulating layer thus provided.

The present invention is based on the solution of the difficulties of problems described above, thereby permitting new applications of an electro-optic display device which applications have not been attained by the conventional electro-optic display cell.

SUMMARY OF THE INVENTION

Accordingly, the primary object of this invention is to provide an electro-optic display device in which in a part outside an image producing region no electro-optical phenomenon occurs even during its operation.

Another object of the invention is an provide a electro-optic display device in which all the limitations in the alignment or arrangement of film leads and film electrodes which have been a great obstacle in designing such a device, is eliminated whereby a a considerably intricate image can be produced.

A further object of the invention is to provide an electro-optic display device in which a conductive layer is uniformly provided over the whole area of the inner surface of one of two substrates regardless of kinds and figures of images to be produced so that it is unnecessay to align a pattern on one substrate with that on such a other substrate, whereby the device with high quality can be readily manufactured.

A still further object of the invention is to provide a reflection type electro-optic display device in which a reflecting electrode is provided over the whole area of the inner surface of one of two substrates regardless of kinds and figures of images to be produced whereby the device has more applications than a conventional reflection type electro-optic display device.

A particular object of the invention is to provide an electro-optic display device for an electronic time piece in which a plurality of electrodes each corresponding to a long hand of a conventional mechanical clock are radially provided, each of the electrodes being made to be utilized properly as a long hand and a short hand of a clock.

A further object of the invention is to provide an electro-optic display device for measuring temperature and humidity, measuring many kinds of speeds, quantity of light, pressure and the like in combination with approprite transducers. A desirable feature of the present invention resides in an electro-optical display device wherein a lead from one electrode is juxtaposed to another electrode. In the use of previously known techniques there would result from this an unpleasant and undesired image during operation. As explained above the prior known attempt to avoid the undesirable image by positioning the electrode lead and the electrode so that they do not face eath other, has been found unsatisfactory because of increased lead resistivity. Also the prior known expedient of interposing an insulating layer between the lead and the electrode, was found ineffective because of insufficient resistivity of the insulating layer. The undesired image is avoided according to the present invention by provision of a supplementary electrode interposed together with an insulating layer between the said lead and an electrode, and the potential difference between the supplementary electrode and the other electrode is maintained low enough so that no such undesirable image is produced.

The manner in which the foregoing and other objects and features are achieved by this invention will become more apparent from the following detailed description and the appended claims when read in conjunction with the accompanying drawings.

DETAILED DESCRIPTION OF THE INVENTION

Figures 1A, 1B:
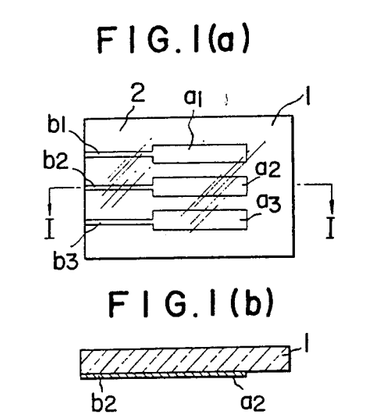
FIG. 1(a) is a plan view of a front substrate.
FIG. 1(b) is a cross-sectional diagram taken along line I—I in FIG. 1(a)

With reference now to FIGS. 1 through 6, there is shown one example of an electro-optic device according to this invention, which comprises as is shown in FIG. 1: a plurality of electrodes (herein referred to as first electrodes) of transparent conductive film $a_1$, $a_2$ and $a_3$ provided on the lower surface of a transparent front (herein referred to as a first substrate) 1 (first substrate), the first electrodes forming or creating an optical image; and thin film leads $b_1$, $b_2$ and $b_3$ formed by extending the first electrodes $a_1$, $a_2$ and $a_3$ towards one end of the substrate 1. The film leads are connected to an external voltage source (not shown). Of course, the first film electrodes and the film leads are simultaneously formed on the front substrate 1. More specifically, the first electrodes and film leads of a metal such as tin oxide and indium oxide or a compound of these metals are formed by a method of vacuum evaporation, sputtering, chemical vapordeposition or spraying. The thickness of the first film electrodes and film leads is on the order of from several hundreds to 2,000 A.

Figures 2A, 2B:
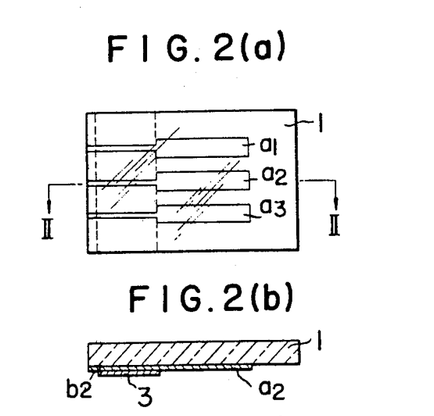
FIG. 2(a) is a plan view of a front substrate provided with an insulating layer.
FIG. 2(b) is a cross-sectional diagram taken along line II—II in FIG. 2(a)

A portion 2 of the lower surface of the front substrate is outside of the optical image region. In this portion 2, an insulating layer 3 is provided covering the surfaces of the film leads $b_1$, $b_2$ and $b_3$ as is shown in FIG. 2, so that, when an electro-optic cell is formed later, the film leads $b_1$, $b_2$ and $b_3$ may not come in contact with the film of electro-optical matter (described later) It is preferable that such an insulating layer 3 is transparent especially when it is employed in a transmission type electro-optical cell. In this connection, for instance, silicon oxide, silicon dioxide, chromium oxide, germanium oxide, magnesium oxide, magnesium fluoride or graphite, or transparent or opaque resin film of, for instance, acryl or butyrated resin, or certain kinds of electrically resistive films can be employed as the insulating layer 3. The thickness of the insulating layer 3 is more than one thousand and several hundred of A.

Figures 3A, 3B:
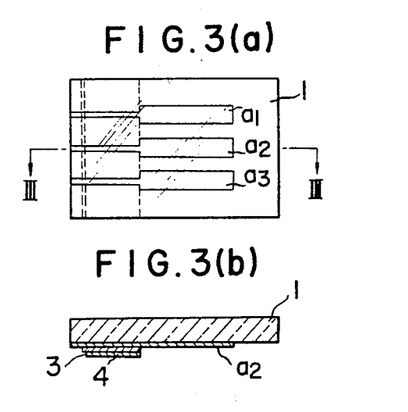
FIG. 3(a) is a plan view of a front substrate in which a conductor film is provided over an insulating layer.
FIG. 3(b) is a cross-sectional diagram taken along line III—III to FIG. 3(a)

Furthermore, as is shown in FIG. 3 a conductive film 4 (herein referred to as a third electrode) is formed on the surface of the insulating layer 3 (FIG. 2). If a transparent insulating layer is employed as the insulating layer 3, the conductive film 4 on the insulating layer 3 should be also transparent. The conductive film 4 is, in general, made of a metal such as tin oxide and indium oxide or a compound of these metals. The thickness of the conductive film 4 is on the order of from several hundred to 2,000 A.

Now, in the case where the film leads $b_1$, $b_2$ and $b_3$ of an oxide such as tin oxide, the insulating layer 3 of an oxide such as silicon oxide and the conductive film 4 of an oxide such as tin oxide are respectively formed, excess firing will cause the formation of a chemical compound between the metals. This will become an obstacle to the achievement of the objects of this invention, and the control of the subsequent firing process becomes very difficult. This fact is a serious problem in the process of assembling an electro-optical cell as will be described later. In order to eliminate such a difficulty, the insulating layer 3 can be formed with graphite, or the like.

In addition, in a view to practical use of the device the conductive layer 4 should be provided in such a manner that the peripheral portion of the insulating layer 3 is slightly exposed.

Figures 4A, 4B:
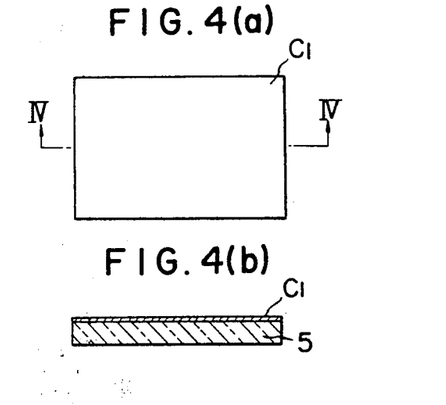
FIG. 4(a) is a plan view of a rear substrate.
FIG. 4(b) is a cross-sectional diagram taken along line IV—IV in FIG. 4(a)

A rear substrate 5 (herein referred to as a second substrate), is substantially the same in shape as the front substrate 1. A second electrode of conductive film $c_1$, is formed over the whole area of the rear substrate 5, the second film electrode $c_1$ being juxtaposed to the first film electrode. The rear substrate 5 and the second film electrode $c_1$ should be transparent when they are employed in the transmission type electro-optic cell. However, when they are employed in the reflection type electro-optic cell, the rear substrate 5 should undergo mirror finish or the film electrode $c_1$ should be changed into a light reflecting conductive film.

The light reflecting conductive film can be produced by forming a metal such as for instance aluminum, chromium, gold and silver by a method of vacuum evaporation, chemical vapordeposition, chemical plating or printing. Aluminum film formed by vacuum evaporation is weak in strength and chemically. In this case, after chromium has been slightly vacuum-evaporated on the surface of the substrate 5, aluminum is vacuum-evaporated.

Figure 5:
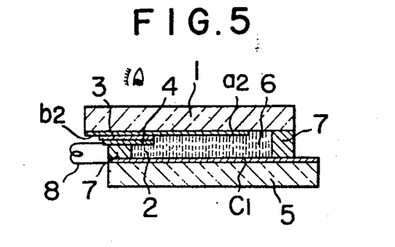
FIG. 5 is a cross-sectional diagram illustrating a photo-optic display device constituted by the front substrate shown in FIG. 3 and the rear substrate shown in FIG. 4.

Then, as is shown in FIG. 5, the front substrate is laid on the rear substrate 5 in such a manner that the first electrodes are juxatposed to the second electrode. An electro-optical matter 6 such as a crystalline liquid matter is filled between the two substrates. The distance between the two substrates 1 and 5 is determined by placing a spacer 7 therebetween. Thus, the electro-optical cell is completed.

In this connection, organic crystalline liquids or colloidal liquids, whose properties are changed electrically and optically and which are produced by dispersing non-organic fine particles or organic fine particles into solvents can be employed as the electro-optical matter 6.

Nematic crystalline liquid matters such as listed below or mixture of crystalline liquids containing two or more nematic crystalline liquid matters are available as the organic crystalline liquids:

Anisal-p-cyanoaniline, p-methylbenzal-p-buthylaniline, p-ethoxybenzal-p-cyanoaniline, p-cyanobenzal-p'-buthylaniline, p-cyanobenzalanisidine, p-cyanobenzalphenetidine, 4'-cyanophenyl-4-n-buthylbenzoate, 4'-cyanophenyl-4-n-hepthylbenzoate, ethyl-(p-anisalamino)-cinnamate, ethyl-p-(p-ethoxybenzalamino)-cinnamate, ethyl-(p-cyanobenzal)-cinnamate, n-buthyl-(anisal-p-amino)-cinnamate, n-buthyl-(p-ethoxybenzalamino)-cinnamate, isoamyl-(anisal-p-amino)-cinnamate, N-(4'-ethoxybenzal)-4-aminobenzonitrile, 4-(4'-n-hexylbenzalamino)-benzonitrile, 4-(4'-n-propylbenzalamino)-benzonitrile, p-azoxyanisole, 4-methoxy-4'-ethoxyazoxybenzene, anisal-p-aminophenylacetate, p-methoxybenzal-p'-n-buthylaniline, p-methoxyformyloxy, benzal-p'-n-buthylaniline, N-(p-methoxybenzal)-p-(2-propoxycarbonyl-1-propenyl)-aniline, p-ethoxybenzal-p-n-buthylaniline, p-methoxy-p'-n-penthylcarbonyloxyazobenzene, p-ethoxy-p'-buthoxycarbonylazobenzene, buthyl-p-(p-ethoxyphenoxycarbonyl)-phenylcarbonate, N-(4-methoxybenzal)-4'-O-n-buthylaminophenole, p-(p-ethoxyphenylazo)-phenylhexonoate, bis-(4-n-octhyloxybenzal)-2-chlorophenylenediamine, 4,4'-bis-(hexyloxy)-azoxybenzene, 4,4'-bis-(hepthloxy)-azoxybenzene, 4- caproiloxybenzoicacid-4'-ethoxyphenylester, and 4-caproiloxybenzoicacid-4'-buthoxyphenylester.

As will be described later, in some cases a mixture prepared by mixing a small amount of cholesteric crystalline liquid matter in a nematic crystalline liquid matter is employed as the electro-optical matter, and sometimes a nematic crystalline liquid matter added with a dipole type additive is employed therefor. In addition, a mixture of alkoxyphenyl-acetyl-chloride, 4-alkylphenyl-acetyl-chloride and 4-acetoxyphenyl-acetylchloride is employed and furthermore a nematic crystalline liquid matter mixed with a smectic crystalline liquid matter is employed as the electrooptic matter.

The colloidal suspension liquids are prepared by dispersing in solvents such as water the organic or nonorganic fine particles of, for instance, tungsten oxide, vanadium oxide, a needle-shaped anisotropic crystal such as rock crystals, bismuth carbonate, lead crystal, herapathite, or polyvinylidenefluoride.

These colloidal liquids are used with dipole type additives.

Furthermore, an organic crystalline liquid of field-effect type made from two or more of the matters listed below can be employed as the electro-optical matter: cholesteryl bromide, cholesteryl chloride, cholesteryl iodide, cholesteryl nitrate, cholesteryl nexanoate, cholesteryl oleate, cholesteryl linoleate, cholesteryl linolenate, cholesteryl nonanoate, cholesteryl decanoate, cholesteryl laurate, oleyl cholesteryl carbonate, 2-(ethyl-hexy) cholesteryl carbonate, heptyl cholesteryl carbonate, octyl cholesteryl carbonate, nonyl cholesteryl carbonate, decyl cholesteryl carbonate, 2-(methoxyethyl) cholesteryl carbonate, methyl cholesteryl carbonate, buthyl cholesteryl carbonate, and p-nonylphenyl cholesteryl carbonate.

These cholesteric crystalline liquid matters scatter on the electric field only the light having particular wave lengths thereby creating color images. Instead of the cholesteric crystalline liquid matters, the suspension of organic pigment can be employed to create colorful electro-optical images.

The thickness of the electro-optical matter 6 is on the order of from several $\mu$m to several tens of $\mu$m. This electro-optical matter serves to form a white or color image on the low electric field.

Figure 6:
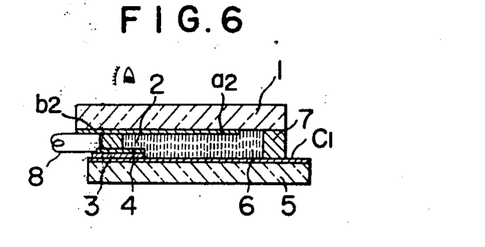
FIG. 6 is a cross-sectional diagram illustrating another embodiment of this invention.

With reference to FIG. 6 there is shown another example of an electro-optical cell according to the invention, in which the same parts as those in FIGS. 1 through 5 are designated by the same reference numerals or symbols.

In this example, both an insulating layer 3 and a conductive film 4 are provided on a film electrode $c_1$ on the surface of the rear substrate 5 in such a manner that they face towards film leads $b_1$, $b_2$ and $b_3$ on the surface of the front substrate 1. In the electro-optical cell thus organized, it may be somewhat difficult to align the front substrate 1 with the rear substrate 5; however, as will be described later, the process of wiring the electro-optical cell sometimes becomes simpler.

With reference to FIGS. 5 and 6, a method of driving the electro-optical cell of this invention will be described. A d.c. or a.c. driving voltage is applied between the first film electrodes $a_1$, $a_2$ and $a_3$ and the second film electrode $c_1$. On the other hand, a lead wire 8 is connected between the conductive film 4 and the film electrode $c_1$ or the film leads $b_1$, $b_2$ and $b_3$, in such a manner that electric potential differences between the conductive film 4 and the film electrode $c_1$ or the film leads $b_1$, $b_2$ and $b_3$ are substantially at zero. In other words, in FIG. 5 the lead wire 8 is connected between the conductive film 4 and the film electrode $c_1$, while in FIG. 6 the lead wire 8 is connected between the conductive film 4 and the film leads $b_1$, $b_2$ and $b_3$. In this connection, in FIG. 6 the direction of taking out the lead wire 8 is the same as that of the film leads $b_1$, $b_2$ and $b_3$, and therefore the wiring in the electro-optical cell is sometimes simpler as was described before.

Thus, in the portion 2 located beside the image region (herinafter this portion 2 being referred to as "an imageless portion 2 when applicable",) an electric potential difference between both sides of the electro-optical matter 6 is maintained substantially at zero. Therefore, no electro-optical phenomenon occurs in this imageless portion at any driving time.

In the above-described embodiments, the potential differences between the film leads $b_1$, $b_2$ and $b_3$ and the film electrode $c_1$ is maintained at zero. However, there is no particular reason why the electric potential differences should be maintained at zero. That is, even if there is a slight electric potential difference $\Delta V$ between the film leads $b_1$, $b_2$ and $b_3$ and the film electrode $c_1$, it will cause no trouble in the operation of the electro-optical cell if the slight electric potential difference is less than the threshold voltage at which the electro-optical matter 6 causes an electro-optical phenomenon.

Figure 7:
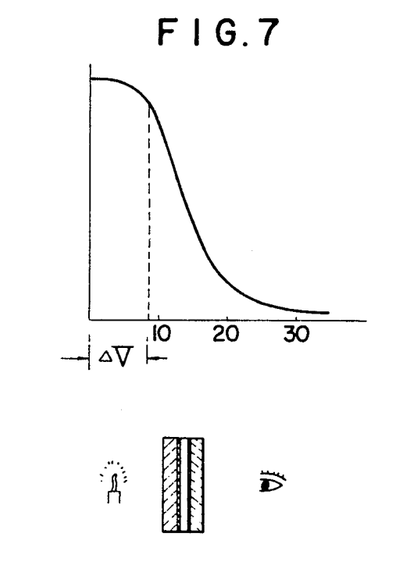
FIGS. 7, 8 and 9 are graphical representations indicating the relationships between applied voltage and light transmissibility.
Figure 8:
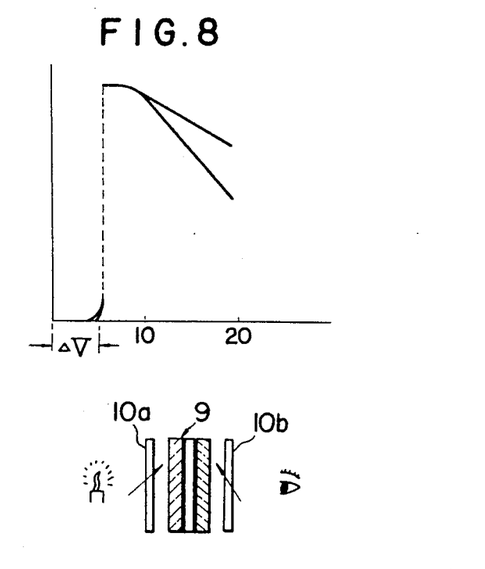
Figure 9:
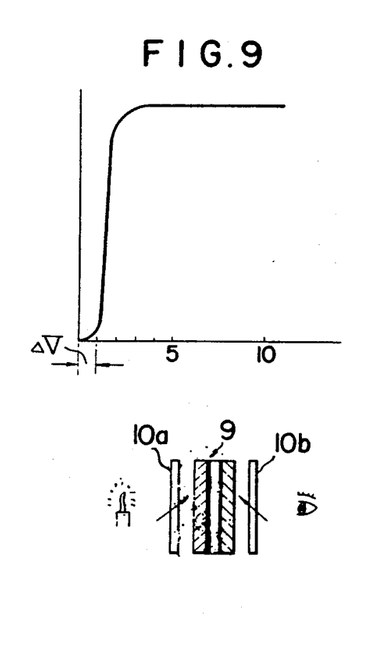

As is shown in FIGS. 7, 8 and 9, the variation of the threshold voltage starting the electro-optical phenomenon depends on the kinds of electro-optical matters 6.

FIG. 7 is a graphical representation illustrating the relationships between applied voltages and light transmissibility in the case where a crystalline liquid film, 10 $\mu$m in thickness, made of a crystalline liquid matter or its mixture whose dipole moment is relatively greatly different from the molecular axis component force, is applied with an electric field to cause a molecular turbulent flow and therefore a light scattering (dynamic scattering).

As is apparent from the graphical representation in FIG. 7, when the applied voltage is less than 7–8 volts, no light scattering phenomenon occurs, that is, practically the light transmissibility is scarcely changed. Therefore, if in this case the electric potential difference $\Delta V$ between both the sides of the electro-optical matter 6 in the imageless portion 2 is less than 7–8 volts, it will cause no trouble in the operation of the electro-optical cell.

FIG. 8 is also a graphical representation indicating the relationships between applied voltages and light transmissibility in the case where an electro-optical phenomenon occurs as follows: That is, a crystalline liquid film, 10 $\mu$m in thickness, made of a crystalline liquid matter or its mixture whose dipole moment is relatively greatly different from the molecular axis, and under the condition that no electric field is applied thereto (hereinafter referred to as a fieldless condition when applicable) the molecules are uniformly aligned vertically or horizontally with respect to the surface of opposed electrodes, is applied with an electric field, as a result of which the crystalline liquid matter changes its state from a state of presenting an optical isotrophy to a state of presenting an optical anisotropy. In this connection, if the applied voltage is sufficiently high, the molecules show a state of turbulent flow and therefore a light scattering phenomenon is observed. In this case, as is shown in the lower part of FIG. 8, a pair of polarizing plates 10a and 10b which form a cross nicol, with an electro-optical cell 9, should be employed in combination with the latter.

As is apparent from the graphical representation, if the electric potential difference $\Delta V$ between both the sides of the crystalline liquid matter 6 in the imageless portion is less than approximately 5 volts, it will cause no trouble in the operation of the electro-optical cell.

There are provided various methods of aligning or orienting the molecules in the electro-optical matter vertically with respect to the surface of the electrodes. For instance, a crystalline liquid matter having hydrophilic groups at the molecular ends is selected, and then the surface of the crystalline liquid matter where the electrode is to be fixed is coated with nonionic lecithin to which the OH radicals are readily connected and is thereafter subjected to heat treatment. In addition, the surface of the electrodes where the crystalline liquid matter are to be fixed can be subjected to acid treatment. Furthermore, it is advisable to add a suitable amount of an assistant for the vertical alignment of molecules, such as p-nitorcinnamic acid-n-buthylester and p-aminocinnamic acid-isoamylester, to the crystalline liquid matter.

In order to uniformly align the molecules of the crystalline liquid matter horizontally with respect to the surface of electrodes, a crystalline liquid matter having nitrile group at the molecular ends which extends in the direction of a dipole moment force is selected and the surface of the electrodes on which the crystalline liquid matter are to be fixed is coated with nonionic lecithin which is readily connected to the nitrile groups and then the surface thus treated is subjected to lapping in a certain direction.

FIG. 9 is a graphical representation indicating one example of the relationships between applied voltages and light transmissibility in the case where the following electro-optical phenomenon is utilized: A crystalline liquid film, 10 $\mu$m in thickness, having a twisted horizontal alignment and made of a crystalline liquid matter or its mixture is employed as the electro-optical matter 6, in whose molecular dipole moment lies along the molecular axis, and under the fieldless condition the molecules are aligned horizontally with respect to the surface of electrodes but the molecular alignment is shifted by 90° in the vicinity of the surface of opposed electrodes, is applied with an electric field to change the molecular alignment, as a result of which the crystalline liquid film changes its state from a state of presenting optical isotropy to a state of presenting optical anisotropy.

In this case, as is shown in FIG. 9, a pair of polarizing plates 10a, and 10b whose polarization directions are in parallel with that of the electro-optical cell 9 should be employed. In this connection, as is apparent from FIG. 9, if the electric potential difference $\Delta V$ between both the sides of the crystalline liquid matter 6 is less than 0.9–1.0 volt (preferably 0.5 volt), it will cause no trouble in the operation of the electro-optical cell. The alignment of the molecules can be controlled by the means described previously.

In the above-described embodiment, the first film electrodes $a_1$, $a_2$ and $a_3$ and the second film electrode $c_1$ are taken out in a left direction and in a right direction, respectively. However, the present invention can be applied to the case where the second film electrode $c_1$ is electrically shifted on the installation surface of the first film electrodes $a_1$, $a_2$, and $a_3$ and the first film electrodes $a_1$, $a_2$ and $a_3$, and the second film electrode $c_1$ are taken out in the same direction.

Furthermore, the present invention has been described in connection with only the case where the second film electrode $c_1$ is provided over the whole area of the rear substrate 5. However, it is possible that the first film electrodes provided on the front substrate 1 are changed into one electrode provided on the whole area of the front substrate while the second film electrode is divided into a plurality of film electrodes.

In general, the surface strength of a reflective film electrode formed by vacuum-evaporating a metal such as aluminum, gold and silver is weaker than that of a transparent conductive film electrode formed by firing a metal such as tin oxide. In a relatively small electro-optical cell where the above-described reflective film electrode or transparent conductive film electrode is divided into a number of regions, for instance in an electro-optical cell for a wrist watch, even if the molecules in the electro-optical matter are tried to be aligned regularly (when the electro-optical matter being filled is the electro-optical cell), the molecular alignment is often put into disorder. Such a phenomenon often appears when the molecules in the electro-optical matter are subjected to the twisted horizontal alignment as described above. It is often found that one of the factors for this phenomenon is that the film electrodes or the film leads are formed rough or uneven.

Figures 10A, 10B:
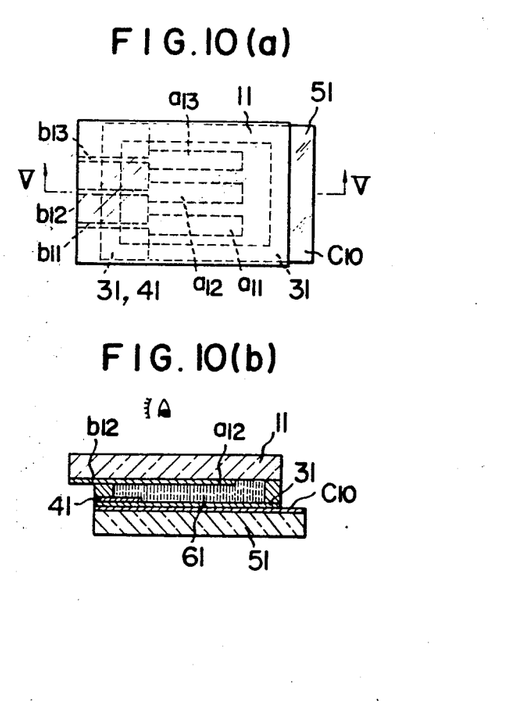
FIG. 10(a) is a plan view of another embodiment of the invention.
FIG. 10(b) is a cross-sectional diagram taken along line V—V in FIG. 10(a)
Figure 11:
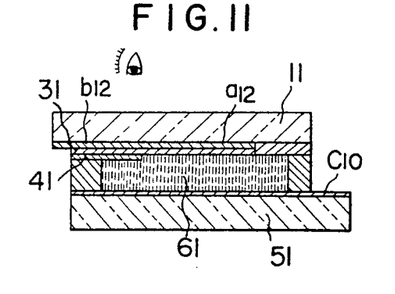
FIG. 11 is a cross-sectional diagram illustrating another embodiment of the invention.

In order to solve the difficulties described above, there are shown two embodiments of the invention in FIGS. 10 and 11. One of the two embodiments is shown in FIG. 10, in which a plurality of first transparent conductive film electrodes $a_{11}$, $a_{12}$ and $a_{13}$ for creating an optical image and transparent film leads $b_{11}$, $b_{12}$ and $b_{13}$ to extend the first transparent film electrodes $a_{11}$, $a_{12}$ and $a_{13}$ outwards are provided on the lower surface of a front substrate 11 (first substrate), while a reflective film electrode of reflective conductive film $c_{10}$ is provided over the whole area of the upper surface of the rear substrate 51 (second substrate). Furthermore, an insulating layer 31 is placed on the reflective film electrode $c_{10}$. The insulating layer 31 is adapted to cover the whole area where an electro-optical matter 61 is filled. Furthermore, a conductive layer 41 is placed on the insulating layer 31 at its portion which confronts the film leads $b_{11}$, $b_{12}$ and $b_{13}$ on the front substrate 1. In general the insulating layer 31 must be transparent and is formed by vacuum-evaporating a metal such as silicon oxide, silicon dioxide, chromium oxide, gerumanium oxide, magnesium oxide, magnesium fluoride and graphite or by coating organic silicon resin, and the conductive layer 41 is formed by vacuum-evaporating metal such as tin oxide and indium oxide or a compound of these metals, as was described before.

Similarly as in the cases of FIGS. 5 and 6, the front substrate 11 is juxtaposed through the electro-optical matter 61 to the rear substrate 51, and the conductive film 41 is held at the same in electric potential as the film leads $b_{11}$, $b_{12}$ and $b_{13}$. Therefore, although the film electrode $c_{10}$ is opposed to the film leads $b_{11}$, $b_{12}$ and $b_{13}$, no electro-optical phenomenon occurs in the imageless portion as was described before.

In this embodiment, the insulating layer 31 serves to reinforce the film electrode $c_{10}$. Therefore, the film electrode $c_{10}$ can be provided merely by vacuum-evaporating a metal such as aluminum, gold and silver on the rear substrate 51. Accordingly, the pretreatment of the film electrode $c_{10}$ such as a process of vacuum-evaporating chromium which has been carried out in order to reinforce the film electrode $c_{10}$, can be eliminated.

The other one of the two embodiments mentioned above is illustrated in FIG. 11 in which the same parts as those in FIG. 10 have the same reference numerals or symbols.

In this embodiment, an insulating layer 31 is applied over the surfaces of film electrodes $a_{11}$, $a_{12}$ and $a_{13}$ and film leads $b_{11}$, $b_{12}$, and $b_{13}$ all of which are provided under a front substrate 11, and furthermore a conductive film 41 is applied on the surface of an insulating layer 31. Since the electric potential of the conductive film 41 is maintained equal to that of a film electrode $c_{10}$, it follows that no electro-optical phenomenon occurs in the imageless portion.

In the embodiment of the invention shown in FIG. 11, the insulating layer 31 is applied, in the form of a lamination, on the surfaces of the film electrodes $a_{11}$, $a_{12}$, and $a_{13}$ and the film leads $b_{11}$, $b_{12}$ and $b_{13}$ and therefore the unevenness formed by the film electrodes $a_{11}$, $a_{12}$ and $a_{13}$ and the film leads $b_{11}$, $b_{12}$ and $b_{13}$ can be eliminated. Accordingly, the difficulty that the molecular alignment is put into disorder when the electro-optical matter 61 is placed between the front and rear substrates can be eliminated.

In the examples shown in FIGS. 10 and 11, it is preferable to make the thickness of the insulating layer 31 as thin as possible so as not to affect the operating characteristic of the electro-optical cells.

In the electro-optical cells shown in FIGS. 1 through 5 and FIGS. 10 and 11, the electric potential of the first or second film electrode is maintained substantially equal to that of the conductor adjacent to the electro-optical matter so that the electro-optical matter does not cause the electro-optical phenomenon. However, there are many other examples of the electro-optical cell according to this invention as will be described.

Figure 12A:
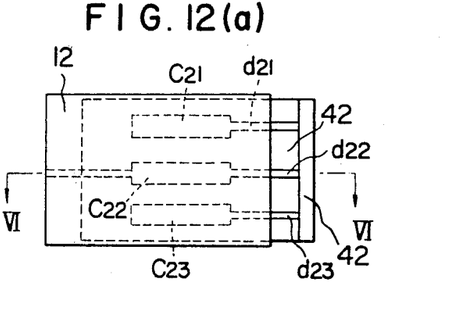
FIG. 12(a) is a plan view illustrating another embodiment of the invention.
Figure 12B:
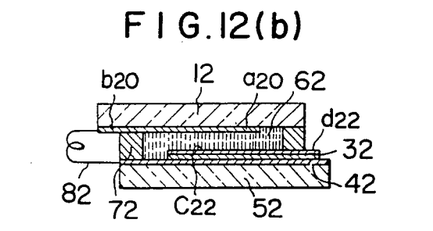
FIG. 12(b) is a cross-sectional diagram taken along line VI—VI in FIG.12(a)
Figure 13:
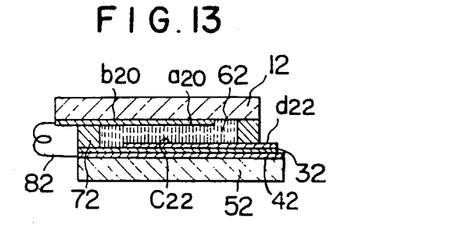
FIGS. 13 and 14 are cross-sectional diagrams respectively illustrating two other embodiments of the invention.
Figure 14:
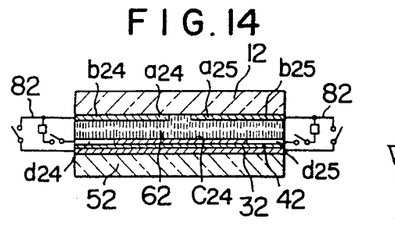

With reference to FIGS. 12, 13 and 14, there is shown another example of the electro-optical cell according to the invention, in which the electric potential of a transparent film electrode provided on a front substrate (first substrate) is maintained substantially equal to that of light reflective film electrodes provided on a rear substrate (second substrate).

More specifically, in the electro-optical cell shown in FIG. 12, a first electrode of transparent conductive film $a_{20}$ and a transparent film lead $b_{20}$ connected to the first film electrode $a_{20}$ are simultaneously formed under a transparent front substrate 12, the film lead $b_{20}$ extending to one end of the front substrate 12 so as to lead the first film electrode $a_{20}$ outward. The first film electrode $a_{20}$ and the film lead $b_{20}$ are made of tin oxide or indium oxide as was described previously.

On the other hand, a rear substrate 52 is formed substantially equal in size to the front substrate 12, and over the whole area of the rear substrate 52 a reflective conductive film 42 is provided. The reflective conductive film 42 is formed by vacuum-evaporating a metal such as aluminum, gold and silver, as was described before.

Then, a plurality of second electrodes of conductive film $c_{21}$, $c_{22}$ and $c_{23}$ for creating an optical image and film leads $d_{21}$, $d_{22}$ and $d_{23}$ for extending the second film electrodes $c_{21}$, $c_{22}$ and $c_{23}$ to one end of the rear substrate 52, respectively, are provided through a transparent insulating layer 32 on the conductive film 42. This insulating layer 32 is formed by coating with silicon oxide, silicon dioxide, chromium oxide, gerumanium oxide, magnesium oxide, magnesium fluoride, graphite or organic silicon resin as was described before. In addition, the film electrodes $c_{21}$ $c_{22}$, and $c_{23}$ and the film leads $d_{21}$, $d_{22}$ and $d_{23}$ may be light reflective films having the same optical properties as the light reflective conductive film 42 or may be formed by vacuum-evaporating tin oxide or indium oxide, as was described before.

Then, the lower surface of the front substrate 12 is piled on the upper surface of the rear substrate 52 in such a manner that electro-optical matter 62 is sandwiched between these two substrates 12 and 52. In FIG. 12, reference numeral 72 indicates a spacer adapted to determine the distance between the front and rear substrates 12 and 52.

In FIG. 13 is shown another example of the electro-optical cell, in which the same parts as those in FIG. 12 are designated by the same numerals or symbols. The only the difference between the electro-optical cell shown in FIG. 12 and that in FIG. 13 is that the insulating layer 32 is extended to a region covering the film lead $b_{20}$.

With reference to FIG. 14, there is shown another example of the electro-optical cell, in which the same parts as those in FIG. 12 are designated by the same reference numerals or symbols. Only the difference between the electro-optical cell shown in FIG. 14 and that in FIGS. 12 and 13 is that the first film electrode provided under the front substrate in FIG. 12 is changed to be a plurality of electrodes $a_{24}$ and $a_{25}$ forming image in FIG. 14, while the second film electrodes provided on the rear substrate 52 in FIG. 12 is changed to be one electrode $c_{24}$ in FIG. 14, and film leads $b_{24}$ and $b_{25}$ and film leads $d_{24}$ and $d_{25}$ are arranged in such a manner that the former film leads are not placed over the latter film leads.

A method of driving the electro-optical cells shown in FIGS. 12, 13 and 14 will be described: A d.c. or a.c. driving voltage is applied between the first film electrodes $a_{20}$, or $a_{24}$ and $a_{25}$, and the second film electrodes $c_{21}$, $c_{22}$ and $c_{23}$, or $c_{24}$. At the same time, the film leads $b_{20}$, or $b_{24}$ and $b_{25}$, is connected to the conductive film 42 by a lead wire 82 so that the potential of the former is substantially equal to that of the latter.

By this connection, in a region outside an image producing region where the film lead $b_{20}$, or $b_{24}$ and $b_{25}$, are provided, that is, in the imageless portion as described before, potentials of both the sides of the electro-optical matter 62 are maintained substantially zero, as a result of which no electro-optical phenomenon occurs in this imageless portion at any driving time. Accordingly, the electro-optical cells can create a clear optical image as required.

The present invention has been described in connection with only the reflection type electro-optical cells; however, it goes without saying that the present invention can be applied to the transmission type electro-optical cells.

In the embodiments described above, the potential difference between the films leads $b_{20}$, $b_{24}$ and $b_{25}$ in the imageless portion and the conductive film 42 is made substantially at zero. However, there is no particular reason why the potential difference should be set at zero. Even if there is a potential difference between the film lead and the conductive film, it will cause no trouble in the operation of the electro-optical cell if the potential difference is less than the threshold voltage starting the electro-optical phenomenon of the electro-optical matter 62.

In the embodiments shown in FIGS. 10 through 13, the first film electrode and the second film electrode are taken out in a right direction and in a left direction respectively; however, the first and second electrodes can be taken out in one and the same direction by electrically shifting the second film electrode onto the first film electrode side for instance, as was described before.

Figure 15A:
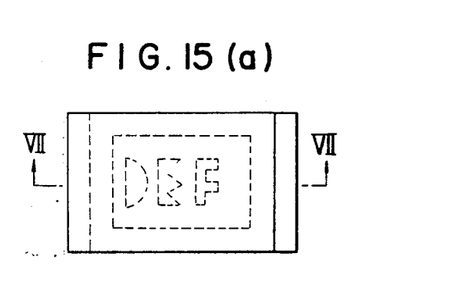
FIG. 15(a) is a plan view of another embodiment of the invention.
Figure 15B:
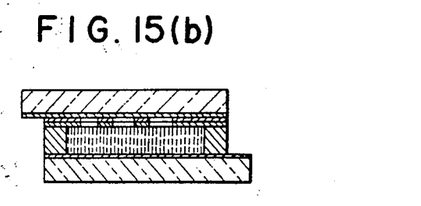
FIG. 15(b) is a cross-sectional diagram taken along line VII—VII in FIG. %5(a)

With reference to FIGS. 5 and 6, and 10 through 14, are described the relatively simple cases where the electro-optical phenomena of simple images such as three linear patterns and two patterns are presented. However, the present invention is not limited to these embodiments only, but can be applied to the case where an electro-optical phenomenon occurs so as to show optical images such as characters or intricate patterns as is shown in FIG. 15. Furthermore, this invention can be applied to the case where the display or presentation of characters or numerals is carried out by dividing them into a plurality of segments or to the case where various complicated optical images are displayed by piling a number of patterns one on another.

In addition, if in the electro-optical cells illustrated in FIGS. 5 and 6 and FIGS. 10 through 14 and FIG. 15 the molecules of the electro-optical matter are uniformly aligned under the fieldless condition and then an electric field is applied between the opposed electrodes to cause a molecular turbulent flow in the electro-optical matter, the combination of the electro-optical cell, a pair of linear polarizing plates and a color filter (with for instance a nematic crystalline liquid matter being employed as the electro-optical matter) can display colorful and optical image formed by the electrodes. Accordingly, it is not necessary to employ a cholesteric crystalline liquid matter as the electro-optical matter.

Figure 16:
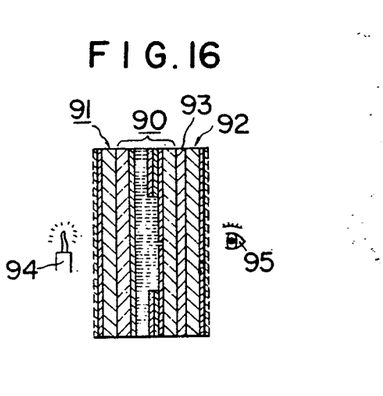
FIGS. 16 through 20 are cross-sectional diagrams respectively showing five other embodiments of the invention.

In FIG. 16 is shown one example of the electro-optical device constituted on the basis of the above-described concept, which comprises an electro-optical cell 90, a pair of linear polarizing plates 91 and 92 and a color filter 93. The functional operation of this electro-optical device is as follows: If under the fieldless conditions, the molecules in the electro-optical matter are regularly aligned thereby to show an optical isotropy, the light from a light source 94 passes through the linear polarizing plate 91, the electro-optical cell 90 and the color filter 93, but cannot pass through the linear polarizing plate 92, as a result of which an observer 95 will see it black. Now, if an electric field is applied between the opposed film electrodes, there occurs a molecular turbulence in the electro-optical matter and the electro-optical matter therefore shows an optical anisotropy. As a result, the light from the light source 94 can now pass through all of the linear polarizing plate 91, the electro-optical cell 90, the color filter 93 and the linear polarizing plate 92, and therefore the image formed by the film electrodes can be displayed colorful.

In the above-described example of the invention, the color filter 93 is positioned between the electro-optical cell 90 and the linear polarizing plate 92. However, the color filter 93 may be positioned between the electro-optical cell 90 and the linear polarizing plate 91 or may be provided on the left side of the linear polarizing plate 91. In some cases, instead of the provision of the color filter 93, the light source 94 can be changed to be a colored light source. If it is dark on the side of an observer 95, the color filter may be provided on the side of the observer 95. In the above-described embodiment, the linear polarizing plates are employed, but other type polarizing plates, when polarizing directions are different from that of the former polarizing plate, can be employed.

Figure 17:
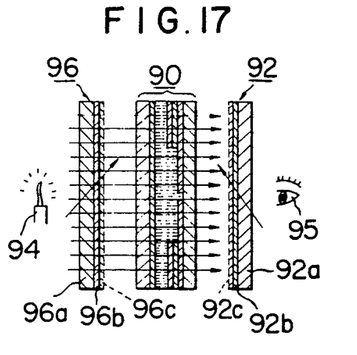

With reference to FIG. 17, there is shown another embodiment of this invention, in which instead of the employment of the color filter, a colored polarizing plate 96, the electro-optical cell 90 and the polarizing plate 92 described above are combined to show a colorful optical image.

The operation of this embodiment of the invention will be described. The colored linear polarizing plate 96 comprises: a substrate 96a; a colored linear polarizing film 96b fixed on one surface of the substrate 96a; and a protective film 96c for the colored linear polarizing film 96b. A linear polarizing plate 92 is the same as employed in the embodiment of the invention described above. More specifically, the linear polarizing plate 92 comprises: a substrate 92a; a linear polarizing film 92b; and a protective film 92c provided on the linear polarizing film 92b. In an electro-optical cell 90 in which the molecules in an electro-optical matter form a twisted structure in helical state, when no electric field is applied thereto, the polarization direction of the colored linear polarizing film 96b is the same as that of the linear polarizing film 92b, as a result of which the observer sees the surface of the cell black; and when the electric field is applied to the cell, the direction of the dipoles of the molecules in the electro-optical matter is gradually shifted towards the direction of the electric field; and when the electric field is increased in strength, the electro-optical cell 90 becomes to show an optical isotropy, as a result of which the colored linear polarizing film 96b passes only the light having a particular wave length and absorbs the other light, thus presenting a mono-color image.

Figure 18:
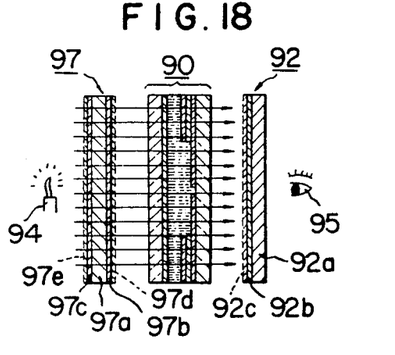

Shown in FIG. 18 is another embodiment of the electro-optical device, which comprises: a compound-colored linear polarizing plate 97; an electro-optical cell 90; and a linear polarizing plate 92. The compound-colored linear polarizing plate 97 is constituted by a substrate 97a, and two colored linear polarizing films 97b and 97c respectively provided on both the surfaces of the substrate 97a, the colors and the direction of the linear polarizing films 97b and 97c being different from each other. Furthermore, the colored linear polarizing films 97b and 97c are provided with protective films 97d and 97e, respectively.

In the case where the molecules in the electro-optical matter form a twisted structure in helical state, when no electric field is applied to the electro-optical cell 90, the observer sees a specific color on the linear polarizing plate; and then when the electric field is applied to the cell 90, a mono-color image different from the image shown under the fieldless condition is displayed.

Figure 19:
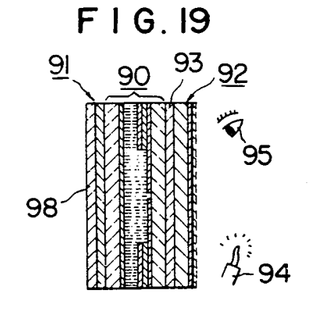

Shown in FIG. 19 is an electro-optical device obtained by providing a light reflective layer 98 on one surface of the polarizing plate 91 in the device shown in FIG. 16. This is a reflection type electro-optical device.

Figure 20:
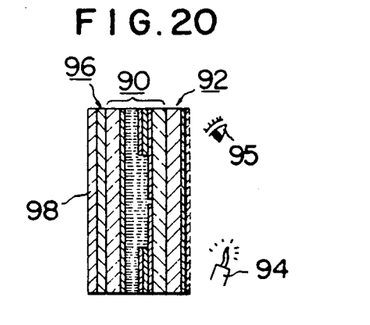

Shown in FIG. 20 is an electro-optical device obtained by providing a light reflective layer 98 on one surface of the colored polarizing plate 96 in the device shown in FIG. 17. This is also a reflection type electro-optical device.

With reference to FIGS. 21 through 26, there are shown examples of the electro-optical display device provided for an electronic time piece, or clock according to this invention.

Figure 21:
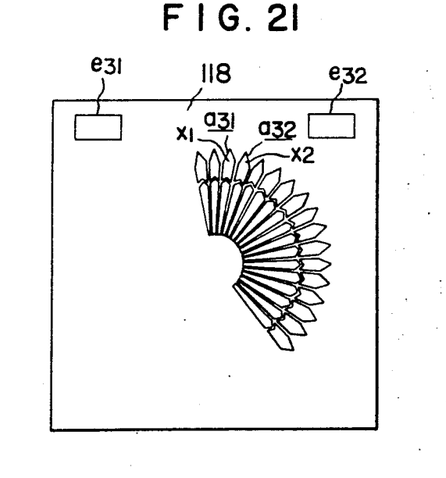
FIG. 21 is a plan view illustrating an electronic time piece according to this invention.
Figure 22:
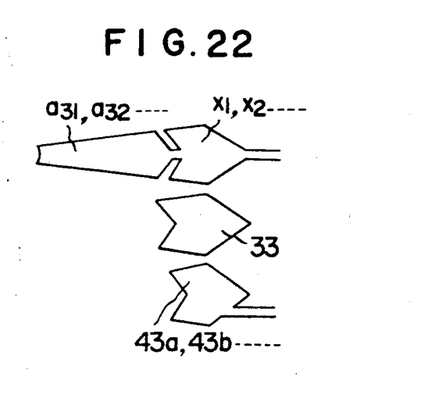
FIG. 22 is a plan view illustrating a film electrode, an insulating layer and a mask electrode all of which are provided in the electronic time piece shown in FIG. 21.
Figure 23:
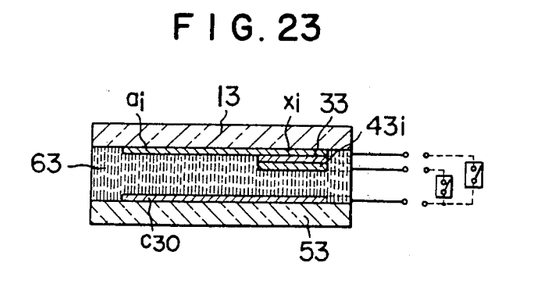
FIG. 23 is a cross-sectional diagram further illustrating the elements shown in FIG. 22.

As is shown in FIGS. 21 and 23, the electro-optical display device comprises a transparent front substrate 13 (first substrate), and the electrodes of conductive film $a_{31}, a_{32}$ . . . radially provided at the equal angles and distances under the transparent front substrate 13, the film electrodes $a_{31}, a_{32}$ . . . being formed corresponding to the long hand (and short hand) of a clock. On the ends $x_1, x_2$ . . . (provided for indicating the long hand of the clock) of the film electrodes $a_{31}, a_{32}$ . . . an insulating layer 33 is provided in the shape of a doughnut, and on this insulating layer 33 mask electrodes of conductive film $43_a, 43_b$ . . . corresponding to the previouslyl described conductive film 4 or 41 or 42 are concentrically and radially provided at equal angles and distances. On the other hand, an electrode of conductive film $c_{30}$ is provided on the whole surface of a rear substrate 53 (second substrate). The first and second substrates 13 and 53 are piled through an electro-optical matter 63 in such a manner that the lower surface of the front substrate 13 confronts the upper surface of the rear substrate 53. In addition, at no signals of input, according to short between film electrodes $a_{31}, a_{32}$ . . . and reflective electrodes $c_{30}$ or between mask electrodes 43a, 43b . . . and reflective electrode $c_{30}$, as will be described later. Accordingly, the electric potential differences between film electrodes $a_{31}, a_{32}$ . . . and reflective electrode $c_{30}$ or between mask electrodes $43_a$, $43_b$ . . . and reflective electrode $c_{30}$ are substantially at zero. The operation of the electro-optical display device will be described with reference to FIG. 24. An output pulse from a timing pulse generator 110 is applied to a second-unit counter circuit 111, an output signal from the second-unit counter circuit 111 is applied to a minute-unit counter circuit 112, and furthermore an output signal from the minute-unit counter circuit 112 is applied to an hour-unit counter circuit 113, thus producing a minute signal A and an hour signal B. The minute signal A and the hour signal B are respectively applied to a minute-unit decoder 114 and an hour-unit decoder 115. Output signals from these decoders 114 and 115 are applied to an OR circuit 116. Output signals from the decoder 114 is applied to a driver circuit 117, and output signal from the driver circuit 117 is applied to the electrodes $a_{31}, a_{32}$ . . . in an electro-optical cell $118_a$ as is shown in FIG. 21 through 23. Output signal from the OR circuit 116 is applied to a driver circuit 119, and output signal from the driver 119 is applied to the mask electrodes 43a, 43b . . . in an electro-optical cell $118_a$ as is shown in FIG. 21 through 23. At not signals, output circuit of the driver 117 is shorted; at input signals, output circuit of the driver 117 is opened and the voltages are applied between a film electrode $a_i$ and reflective electrode $c_{30}$ in an electro-optical cell $118_a$, as was described before. At no signals, output circuit of the driver 119 is shorted; at input signals, the output circuit of the driver 119 is opened and the voltages are applied between a mask electrode $43_i$ and reflective electrode $c_{30}$ in an electro-optical cell $118_a$, as was described before.

Accordingly, on a portion at the hours and minutes an electro-optical phenomenon presents by the electro-optical matter 63. By this invention the electronic-clock is provided instead of the usual mechanical clock.

Figure 24:
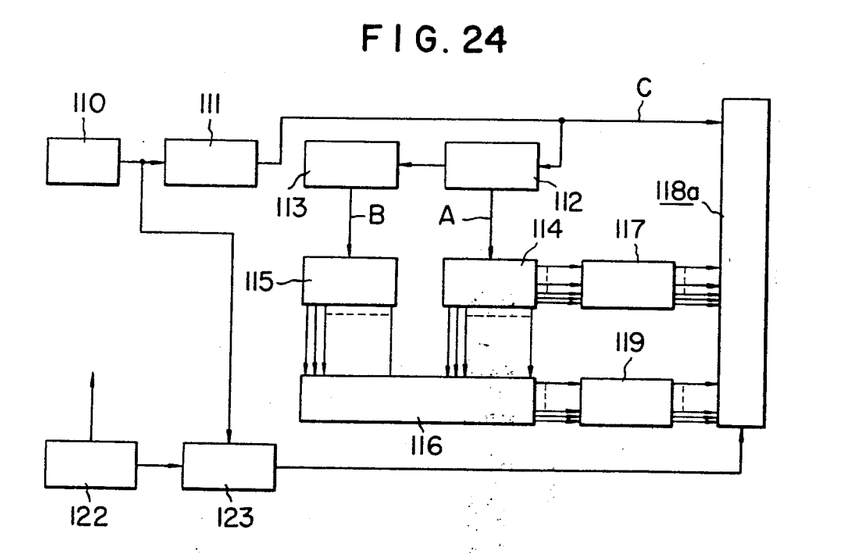
FIG. 24 is a block diagram illustrating an electronic time piece driving circuit.

Reference numerals 122 and 123 designate a voltage source and an inverter, respectively, and reference symbols $e_{31}$ and $e_{32}$ designate "morning (A.M.)" and "afternoon (P.M.)", or a day and a day of the week, respectively. Flicking of those symbols accordingly to the output signal of second-unit counter circuit 111 gives effectively to a this invention.

Figure 25:
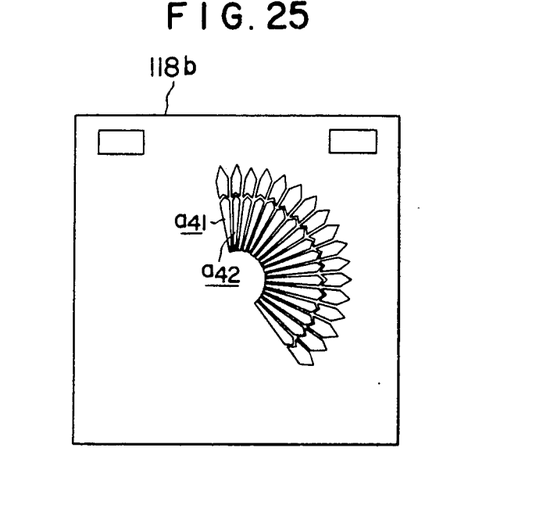
FIG. 25 is a plan view of another embodiment of an electronic time piece according to the invention.
Figure 26:
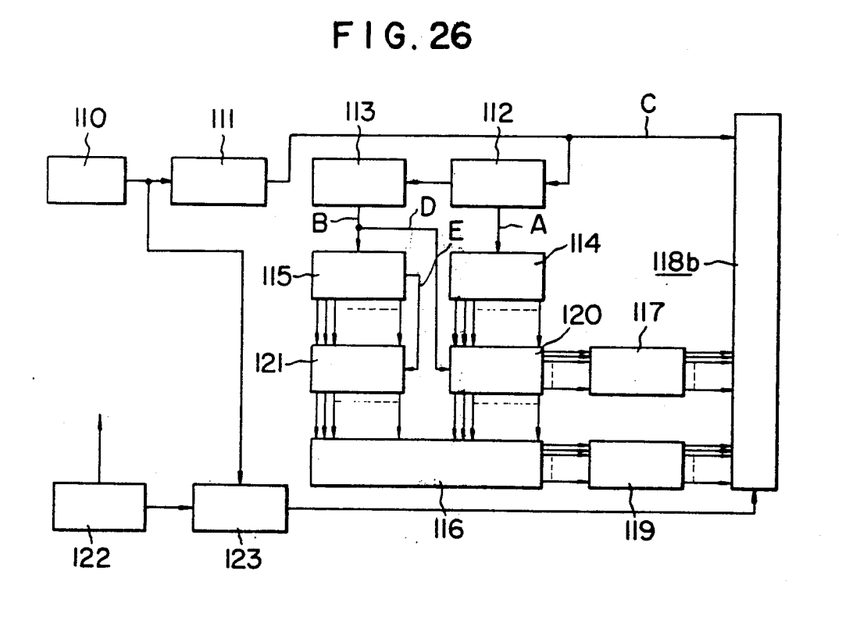
FIG. 26 is a block diagram illustrating an electronic time piece driving circuit.

With reference to FIGS. 25 and 26, there is shown another embodiment of the electro-optical display device according to the invention, in which the same parts as those in FIGS. 21 through 24 are designated by the same reference numerals or symbols. Only the parts differ from the electro-optical display device shown in FIGS. 21 through 24 will be described.

In this embodiment, the images of the hour and minute in this electro-optical cell $118_b$ spread continuously concentrically from the portion zero o'clock, and the film electrode is divided into parts $a_{41}, a_{42}$ . . . for indicating and the long hand mask electrode is divided into parts $44a, 44_b$ . . .

As is shown in FIG. 26, in this driving circuit, output signals from a minute-unit decoder 114 and an hour-unit decoder 115 are stored in a minute-unit memory 120 and an hour-unit memory 121, which produce their output signals, respectively. Accordingly, voltage is applied to the film electrodes $a_{41}, a_{42}$ . . . and the mask electrodes $44_a, 44_b$ . . . in the order described, as a result of which the long hand and the short hand are succeedingly displayed with time beginning at the portion of 12 o'clock. When this display completes one revolution, that is, when it passes 60 minutes or 12 hours, a reset signal D and E cancel contents stored in the memories 120 nd 121, and the display of time is started beginning at the position of 12 o'clock.

The present invention is not limited to these embodiments only, but can be applied to an electro-optic display device for measuring temperature and humidity, and many kinds of speed, quantity of light, pressure and the like in combination with appropriate transducers.

We claim:

1. An electro-optical display device comprising:
    a pair of juxtaposed spaced substrates having inner surfaces facing each other;
    electro-optical material between said substrates;
    planar electrode means secured to the inner surface of one of the substrates;
    second planar electrode means secured to the inner surface of the substrate juxtaposed, thereto;
    lead means extending along the inner surface of one of said substrates from the electrode means secured to it;
    planar insulating means interposed at least between said lead means and the substrate juxtaposed to said lead means;
    third electrode means interposed between the insulating means and the last mentioned substrate; and means maintaining the electrical potential differences between the third electrode means and the second electrode means within the voltage range wherein the electro-optical material produces no electro-optical phenomenon;

at least part of said electro-optical material being interposed between the insulating means and the last mentioned substrate.

2. An electro-optical display device comprising:

a pair of substrates spaced from and juxtaposed to each other;

electro-optical material disposed between said juxtaposed substrates;

first electrode means and lead means therefrom at the surface of of a first of said substrates facing the second of the substrates;

second electrode means at the surface of the second substrate facing the first substrate;

an insulating layer interposed between the lead means and the second electrode means;

a third electrode interposed between the insulating layer and the second electrode means; and means maintaining the electrical potential difference between the third electrode means and the second electrode means within the voltage range wherein the electro-optical material produces no electro-optical phenomenon.

3. A device according to claim 2 in which said means maintaining the potential difference comprises a short circuit connection between the third electrode means and the second electrode means.

4. A device according to claim 2 in which the insulating means comprises a layer interposed between all parts of the first and second substrates which are juxtaposed to each other.

5. A device according to claim 2 in which the insulating means covers all of the inner surface of the first substrate and the means controlling the potential difference in a short circuit between the third electrode and the second electrode.

6. An electro-optical display device comprising:

a first substrate;

a second substrate juxtaposed to and spaced from the first substrate;

electro-optical material positioned between the first and second substrate;

a plurality of first electrodes and leads therefrom provided on the surface of the first substrate facing the second substrate;

a second electrode on the surface of the second substrate which faces the first substrate;

an insulating layer covering at least part of the second electrode which is juxtaposed to said leads;

a third electrode covering the insulating layer; and means maintaining the potential difference between the first and third electrodes within the voltage range in which the electro-optical material produces no electro-optical phenomenon.

7. A device according to claim 6 in which the means controlling the potential difference comprises a short circuit between the third and first electrodes.

8. A display device according to claim 6 in which said first electrodes and their leads are of transparent conductive film material and the second electrode is of reflective conductive film material, and said insulating layer substantially covers the second electrode.

9. A device according to claim 6 in which the insulating layer covers all the second electrodes and the means controlling the potential difference is a short circuit between the third and first electrodes.

10. An electro-optical display device comprising a first substrate and a second substrate spaced from and juxtaposed to each other, each having an inner surface facing the other; a transparent electrode on the inner surface of the first substrate;

a conductive layer on the inner surface of the second substrate;

an insulating layer covering the conductive layer and a second electrode covering said insulating layer;

an electro-optical material positioned between said second electrode and the transparent electrode; and means maintaining the electric potential of the conductive layer now enough so that the electro-optical material produces no electro-optical material produces no electro-optical phenomenon.

11. An electro-optical display device as claimed in claim 10 in which said transparent electrode provided on said inner surface of said first substrate is juxtaposed through said electro-optical material with said second electrode and said conductive layer is separated by said insulating layer from said second electrode, the conductive layer and the transparent layer being short-circuited.

12. An electronic time piece comprising assemblies each of which is formed by placing a mask electrode through an insulating layer on a plurality of film electrodes placed under a first transparent electrode, said assemblies being radially arranged, the film electrodes being shaped in the form of a short hand and a long hand respectively for the indication of time, the lower surface of the first transparent substrate being juxtaposed through electro-optical matter to an electrode provided on a second substrate, the film electrodes and the maks electrode being connected to electrode driving output terminals of a time piece circuit.

13. An electronic indicator comprising assemblies each of which is formed by placing a mask electrode through an insulating layer on a plurality of film electrodes placed under a first transparent electrode, said assemblies being continuously arranged, the film electrodes having shapes from which indications can be individually recognized, the lower surface of the first transparent substrate being juxtaposed through electro-optical matter to an electrode provided on a second substrate, the film electrodes and the mask electrode being connected to electrode driving output terminals of a transducer for temperature, humidity, weight, quantity of light, intensity of radiation, pressure or the like.

* * * * *